US008651416B2

(12) United States Patent
Journade et al.

(10) Patent No.: US 8,651,416 B2
(45) Date of Patent: Feb. 18, 2014

(54) AIRCRAFT ASSEMBLY INCLUDING AN ELEMENT FOR MOUNTING AN ENGINE AND ASSOCIATED AIRCRAFT

(75) Inventors: Frederic Journade, Toulouse (FR); Laurent Lafont, Pechbusque (FR); Laurent Agostini, La Salvetat Saint Gilles (FR); Eric Renaud, Brignemont (FR); Delphine Jalbert, Seilh (FR)

(73) Assignee: Airbus Operations S.A.S., Toulouse (FR)

( * ) Notice: Subject to any disclaimer, the term of this patent is extended or adjusted under 35 U.S.C. 154(b) by 126 days.

(21) Appl. No.: 13/496,033

(22) PCT Filed: Sep. 20, 2010

(86) PCT No.: PCT/FR2010/051950
§ 371 (c)(1),
(2), (4) Date: Mar. 14, 2012

(87) PCT Pub. No.: WO2011/036386
PCT Pub. Date: Mar. 31, 2011

(65) Prior Publication Data
US 2012/0168558 A1 Jul. 5, 2012

(30) Foreign Application Priority Data
Sep. 22, 2009 (FR) ..................................... 09 56527

(51) Int. Cl.
*B64D 27/00* (2006.01)
(52) U.S. Cl.
USPC ............................... 244/54; 248/554; 60/297

(58) Field of Classification Search
USPC .................... 244/54; 248/554, 555, 556, 557; 60/297, 296
See application file for complete search history.

(56) References Cited

U.S. PATENT DOCUMENTS

| 5,746,391 | A * | 5/1998 | Rodgers et al. | 244/54 |
| 7,350,747 | B2 * | 4/2008 | Machado et al. | 244/54 |
| 7,451,947 | B2 * | 11/2008 | Machado et al. | 244/54 |
| 7,677,493 | B2 * | 3/2010 | Diochon et al. | 244/54 |
| 7,740,200 | B2 * | 6/2010 | Diochon et al. | 244/54 |

(Continued)

FOREIGN PATENT DOCUMENTS

| EP | 1 902 951 A1 | 3/2008 |
| FR | 2 873 987 A1 | 2/2006 |

(Continued)

OTHER PUBLICATIONS

U.S. Appl. No. 13/496,102, filed Mar. 14, 2012, Jounade, et al.

(Continued)

Primary Examiner — Christopher P Ellis
(74) Attorney, Agent, or Firm — Oblon, Spivak, McClelland, Maier & Neustadt, L.L.P.

(57) ABSTRACT

An engine is mounted on a structure by an intermediate structure assembled by flanges, to the structure and to the engine, where a rigid structure connects the flanges. This arrangement enables design of the structure to be simplified while allowing a substantial overhang when it is sought to mount the engine by the plane of its center of gravity, while being obliged to move the mounting structure away from it. The intermediate structure is resistant to forces resulting from the overhang, and also allows assemblies that are favorable to a balanced transmission of forces to the structure and a satisfactory ability to filter vibrations.

9 Claims, 5 Drawing Sheets

(56) References Cited

U.S. PATENT DOCUMENTS

| | | | |
|---|---|---|---|
| 7,784,733 B2* | 8/2010 | Diochon et al. | 244/54 |
| 8,038,092 B2* | 10/2011 | Diochon et al. | 244/54 |
| 8,042,342 B2* | 10/2011 | Diochon et al. | 60/797 |
| 8,118,251 B2* | 2/2012 | Suciu et al. | 244/54 |
| 8,118,252 B2* | 2/2012 | Dumont et al. | 244/54 |
| 8,141,817 B2* | 3/2012 | Baillard et al. | 244/53 R |
| 8,162,254 B2* | 4/2012 | Roche | 244/54 |
| 2003/0201366 A1* | 10/2003 | Connelly et al. | 244/121 |
| 2008/0042008 A1 | 2/2008 | Diochon et al. | |
| 2008/0067287 A1 | 3/2008 | Guibert et al. | |
| 2009/0183512 A1* | 7/2009 | Suciu et al. | 60/797 |
| 2009/0255271 A1 | 10/2009 | Vauchel et al. | |
| 2011/0290934 A1* | 12/2011 | Journade et al. | 244/54 |
| 2012/0111995 A1* | 5/2012 | Lafont | 244/54 |

FOREIGN PATENT DOCUMENTS

| | | |
|---|---|---|
| FR | 2 900 907 A1 | 11/2007 |
| FR | 2 907 098 A1 | 4/2008 |
| FR | 2 913 664 A1 | 9/2008 |
| FR | 2 928 347 A1 | 9/2009 |
| WO | WO 2008/000924 A1 | 1/2008 |

OTHER PUBLICATIONS

International Search Report issued Nov. 18, 2010 in PCT/FR2010/051949.

International Search Report issued Nov. 18, 2010 in PCT/FR2010/051950.

* cited by examiner

AIRCRAFT ASSEMBLY INCLUDING AN ELEMENT FOR MOUNTING AN ENGINE AND ASSOCIATED AIRCRAFT

The subject of this invention is an aircraft assembly including an element for mounting an engine and an associated aircraft.

The element is associated with a structure for mounting the engine on a fuselage or a wing surface. Most known mounting structures include a linear main portion, followed by a connecting portion to which the engine is directly attached, and which has a half-barrel shape. This design has several disadvantages, and above all a poor transmission of the thrust originating from the engine, which produces substantial bending moments which are poorly distributed in the connecting portion, together with vibrations which it is difficult to filter and which impair comfort in the aircraft cabin.

A major consideration is that it is often impossible to have the main portion of the structure in the plane of the engine's centre of gravity, although it is often recommended to mount the engine in the structure in this plane in order to reduce engine deformation; to uncouple the vibrational modes and enable them to be treated individually in order to filter them; and finally to limit deflection within the engine, which leads to irregularities of play between the rotor and the stator, reduced efficiency, and possibly premature wear and tear. If the main portion of the structure must be at some distance from the engine's centre of gravity, for example in order that it is apart from propellers, engine mounting by the centre of gravity must be achieved by accepting an overhang in the connecting portion, which is often unacceptable with the existing designs.

Document WO-A-2008/000924 describes an element for mounting an aircraft engine on a mounting structure which consists of two circular flanges separated by a mesh of profiles or tubes, but the mounting element is suspended by both its flanges at the end of the structure such that it is not used to transmit regularly the deflection movements to the structure. On the contrary, the structure itself includes an overhanging horizontal end, which transmits these deflection movements whilst being deformed, in an unfavourable manner. Finally, the engine is not apparently mounted by the plane of its centre of gravity, implying an increase of these deflection movements.

The aim of the invention is to add to the mounting structure an element for mounting the engine, capable of transmitting all the motive forces in a plane perpendicular to the axis of the engine, attached to the connecting portion of the structure and to the engine by opposite ends, the structure of which is indeed different to that of the connecting portion, such that the mounting element has sufficient resistance to the forces produced by the overhang, and is able to transmit under satisfactory conditions, with a quite regular distribution, all the motive forces as far as the mounting structure, and in particular moments $M_y$ and $M_z$. Easy assembly between the element, the mounting structure and the engine is also sought.

In a general form, the aircraft assembly includes a mounting structure, an engine and a mounting element extending between the mounting structure and the engine, where the mounting element includes a first flange attached to the structure, a second flange attached to the engine, where the flanges are circular, and a rigid structure connecting the flanges, where the flanges and the rigid structure surround the engine, characterised in that the second flange extends around a centre of gravity region of the engine, and the engine is assembled on the structure in an overhanging fashion.

The circular shape of the second flange enables the engine to be attached to it regularly over its entire circumference, and thus a thrust force to be transmitted in quite uniform fashion to the mounting element, also limiting its deflection. It becomes easy to accomplish the mounting of the engine by the plane of its centre of gravity, since the mounting element is able to be of great length without any great disadvantage. The mounting structure's connecting portion can be manufactured with a simplified shape, which is easy to manufacture, and has no overhang in the axial direction of the engine and of the aircraft. The connection of the element to be mounted on the structure by the first circular flange is also favourable for regular transmission of the forces to the structure, limiting its deflection still further.

The rigid structure favourably consists of separate elements, and is discontinuous over the circumference, making it lighter. These separate elements can be frames, profiles or tubes.

The freedom of design of the mounting element can extend to the flanges, which can easily be chosen such that they are not parallel relative to one another, depending on the engine's assembly restrictions or the force transmission characteristics.

Satisfactory distribution of the forces and also limitation of engine deformation are frequently facilitated if the second flange is attached to the engine by connections transmitting forces only in certain directions, and similarly if the first flange is also attached to the structure by such connections.

These advantages are more accessible with the following favourable designs. The connections advantageously define an isostatic assembly between the first or second flange and the structure or engine, as applicable. Such an assembly, which is particularly appreciated, consists of three connections distributed around the first flange or the second flange and shaped to transmit the forces in two directions each. These two directions are favourably an axial direction of the aircraft and an essentially tangential direction of the first or second flange for each of the flexible connections.

In a particularly preferred configuration the connections are more regularly distributed around the second flange than around the first flange, respectively at angles of 90° to 120° and at angles of at most 90°, where each of the (or cantilevered) flanges has a connection to a higher cone distance of the assembly.

To support the part under the structure which is overhanging (or cantilevered) relative to the junction of the connection to the engine, an additional flexible connection is added between the engine and the structure, where the additional flexible connection and the mounting element are positioned either side of the structure in an axial direction of the aircraft.

Filtration of the vibrations originating from the engine may be achieved by implementing all these connections using flexible connections, and more specifically those joining the second flange or engine.

Another benefit of the invention which is the simplification of the shape of the mounting structure, and more specifically of its connecting portion, may be achieved by a mounting structure which includes a linear portion and a connecting portion joining the main portion to the mounting element, where the connecting portion includes two flat wings extending laterally to the main portion forming an angle between them, and an attaching flange extending over at least a sector of a circle, attached to the wings by a flat face and attached to the first flange of the engine's mounting element for an opposite face. This mounting structure shape is simple to manufacture and assemble, and the flat wings of the connecting part are indeed resistant to the forces. It is however advantageous for them to have a width equal to the main portion of the structure in the aircraft's axial direction, in order that the entire overhang belongs to the mounting element, which is more capable of sustaining the corresponding forces.

The wings are advantageously increasingly short the further they are from the attaching flange, in order that the engine is better exposed, for purposes of inspection and maintenance.

The invention also concerns an aircraft fitted with an engine mounting element or with an assembly according to the foregoing.

The invention will now be described with reference to the figures.

Figure 1:
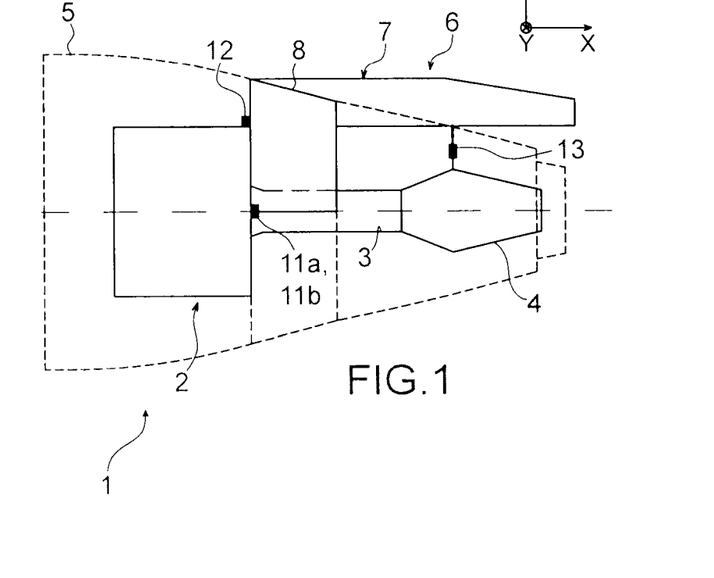
FIGS. 1 and 2 represent a first engine mounting design according to the prior art.
Figure 2:
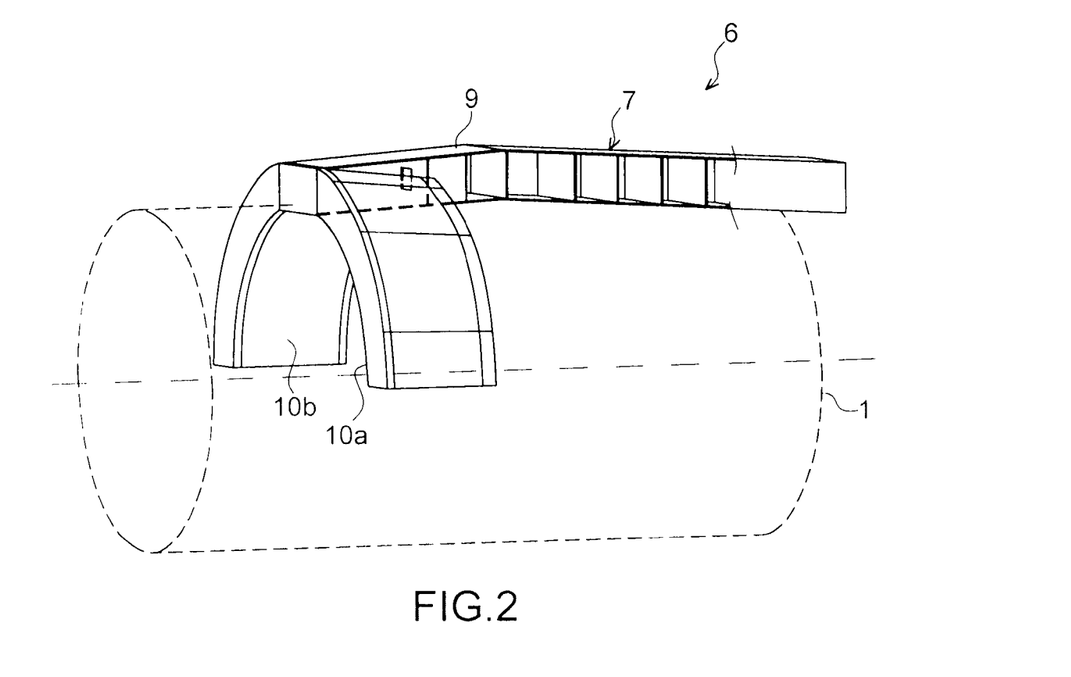

One end of a mounting structure in accordance with the previous indications is the subject of French patent 2 900 907, the description of which is illustrated briefly in FIGS. 1 and 2. Engine 1 firstly includes at the rear a fan element 2, a high-pressure element 3 ("core") and a front-to-rear ejection element 4 in a nacelle 5. Structure 6 includes a rigid main portion 7 extending lengthways above high-pressure portion 3 and ejection portion 4, and a mounting portion 8. FIG. 2 shows that main portion 7 has a stiffened structure consisting of boxes and that mounting portion 8 includes a central stringer 9, extending over the upper cone distance of engine 1 (at twelve o'clock), which extends main portion 7; mounting portion 8 is itself extended by semicircular wings, 10a and 10b, each of which covers a quarter circle, and which also have a stiffened structure consisting of boxes. FIG. 1 also represents the connections of the engine to the structure, 11a and 11b, extending to the base of wings 10a and 10b respectively, 12 extending in front of stringer 9 and 13 extending between main portion 7 and the middle of ejection portion 4, which is markedly to the rear of the previous ones, which are positioned in a junction plane between fan portion 2 and high-pressure portion 3.

This design therefore has the disadvantages that it is difficult to design and manufacture mentioned above, due to the variations of direction between horizontal main portion 7, inclined stringer 9 and uninclined wings 10a and 10b and risks of poor transmission of the thrust to structure 6 due to the great horizontal length of portion 7 and the corresponding overhang.

Figure 3:
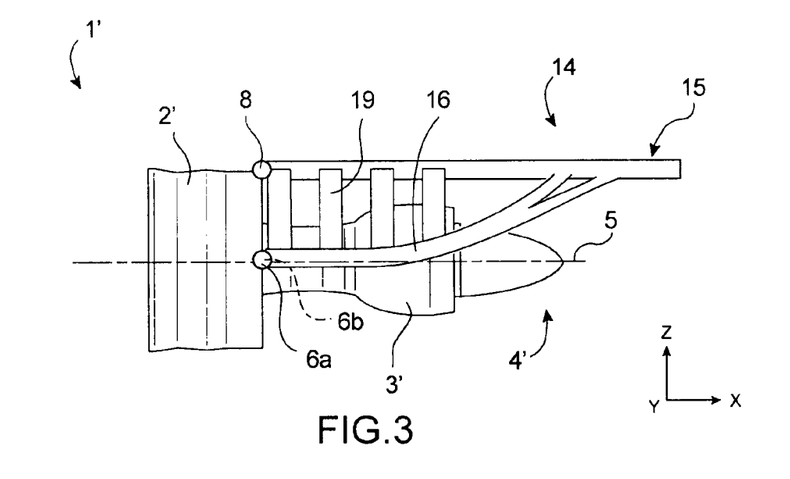
FIGS. 3 and 4 represent a second prior design.
Figure 4:
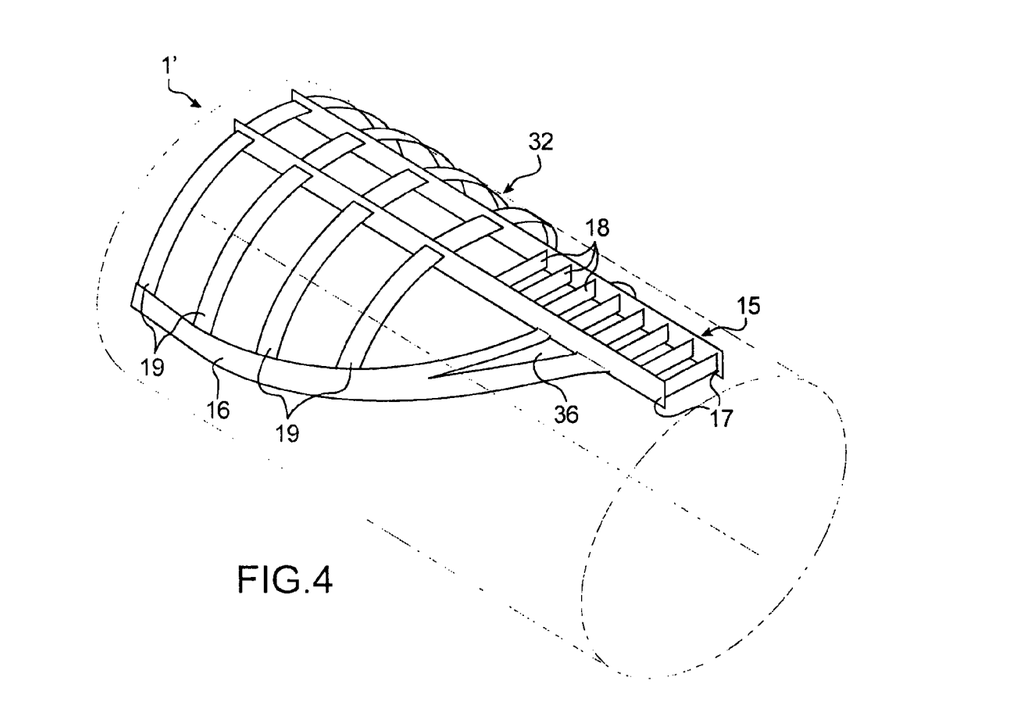
Figure 5:
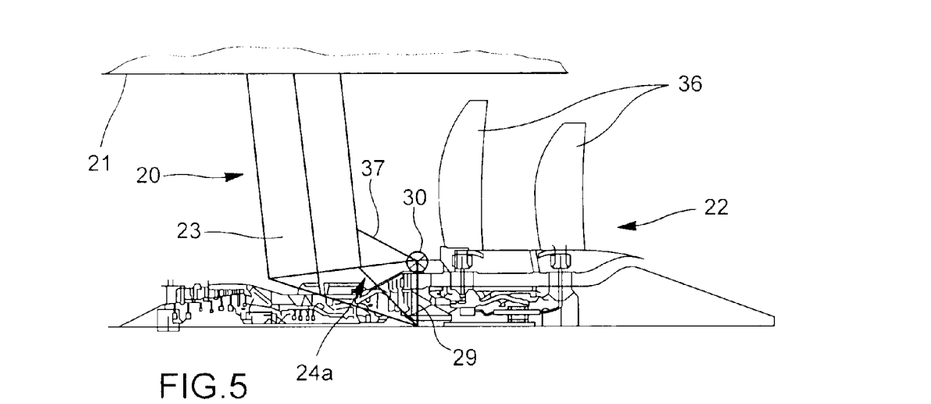
FIGS. 5 to 8 represent an aircraft mounting design which does not form part of the invention, although the mounting structure can be used with it.
Figures 6, 7, 8:
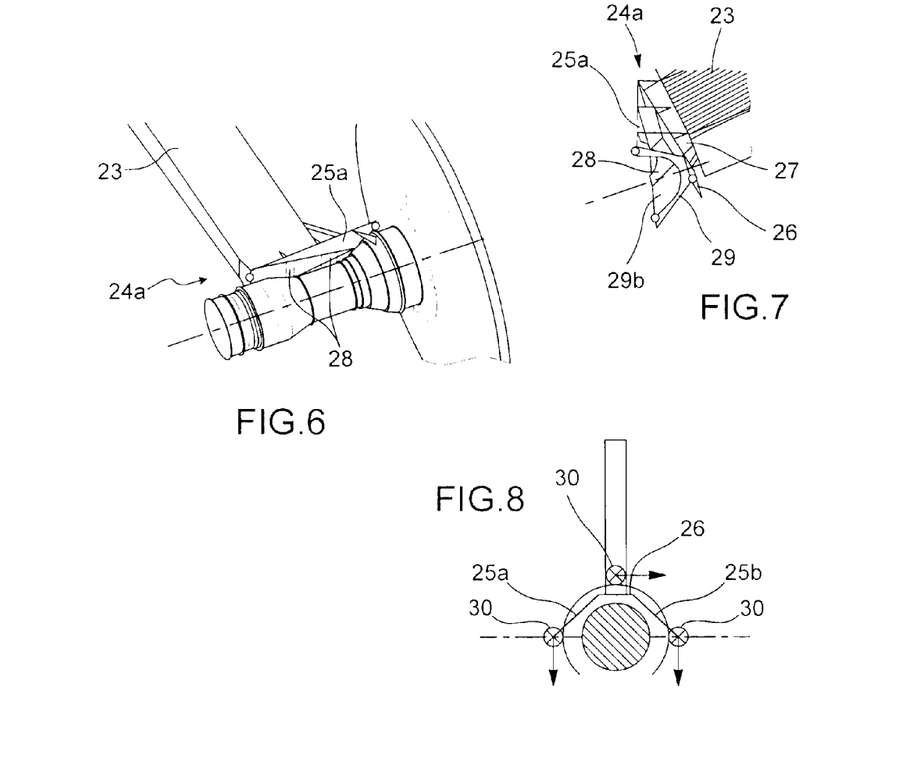

The design of French patent 2 873 988 will also be mentioned, represented in FIGS. 3 and 4, where an engine 1', comparable to the previous one in that it consists of a fan portion 2', a high-pressure portion 3' and an ejection portion 4', is supported by a structure 14 including a rigid structure 15 aligned with the aircraft axis, and from which symmetrical ribs 16 extend (a single one is shown in the figures), which moves lower along the length of engine 1' as far as its median horizontal plane as it extends forwards. Rigid structure 14 consists of two parallel stringers 17 ribbed by transverse intermediate braces 18 which connect them. Hoops 19 connect ribs 16 to stringers 17, and stringers 17 to one another forward of struts 18. Here again the overhang of structure 14 is substantial and the large number of curved parts make manufacture difficult.

A first embodiment of a new mounting structure is described by means of FIGS. 5, 6, 7 and 8. The structure is given general reference 20 and connects an aircraft 21 (partially represented) to an engine, now 22. It includes a linear and roughly vertical main portion 23, which can have a boxed-based structure as in many known embodiments, and a portion 24a which connects to engine 22. Connecting portion 24a includes two symmetrical wings 25a and 25b, which are at an acute or obtuse angle to one another, extending either side of main portion 23 in a lateral direction, and beneath it, covering a central portion of engine 22. Wings 25a and 25b are flat panels, connected to one another by a central panel 26 with which they form a single part, and which is combined with an end face 27 of main portion 23, and they are made rigid by ribs 28 located under main portion 23, which connect them to one another and also to central panel 26.

Connecting portion 24a also includes an attaching flange 29, which may be flat or box-shaped, extending over a sector of a circle; it is combined with wings 25a, 25b and with central panel 26 by a flat face, and supports connections 30 to engine 22. One of connections 30 is at twelve o'clock (to the upper cone distance of engine 22); the others are at the height of the horizontal median plane or higher (forming an angle of 180° or less, the top of which is in the axis of rotation of engine 22) on its face. This embodiment is characterised by very great simplicity of design, which means in particular in that all the parts are flat and defined by rectilinear edges, which it is therefore easy to assemble, with the inevitable exception of attaching flange 29, which it is nonetheless possible to attach by a flat face to the ends of wings 25a, 25b and of central panel 26. The appearance of complex stresses is also limited in connecting portion 24a, notably bending stresses around the vertical axis Z and transverse axis Y, which are difficult to prevent in previous designs of more complicated shape: the thrust of engine 22 is transmitted to wings 25a, 25b and to central panel 26 in the form of forces directed in their plane, theoretically without a perpendicular component with regard to which the connecting part would be much less rigid.

Connections 30 can be positioned in the same transverse plane of engine 22, advantageously close to its centre of gravity, and can consist of flexible connections. The resulting effects will be described in greater detail in connection with another embodiment. It should be noted that, generally, the embodiments described in this text are neither exclusive nor incompatible, but that their details can, on the contrary, often be combined or transposed by determining the forces associated with these details.

Figure 9:
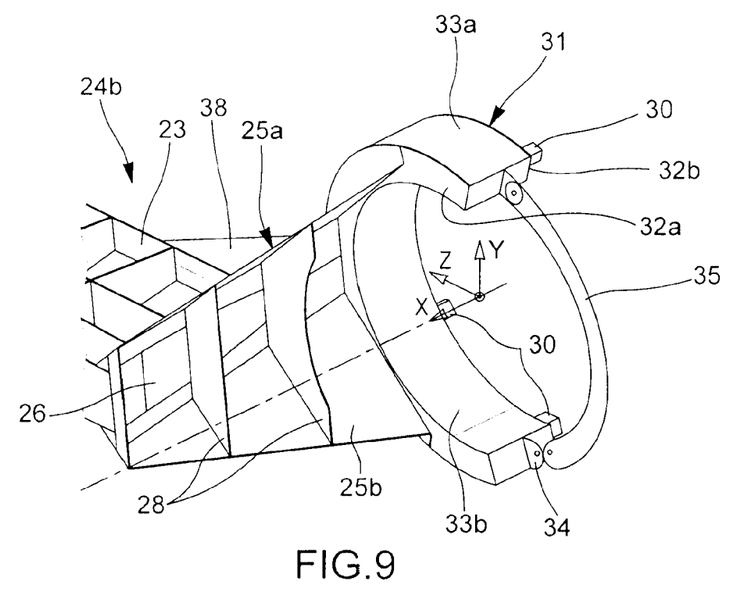
FIG. 9 represents another mounting structure design.

FIG. 9 represents another embodiment, in which the attaching flange now has reference 31 and is distinguished from the previous one in that it extends over a certain width (measured in the axial direction of engine 22 and of aircraft 21), that it has a structure partitioned into boxes with two flat skins 32a and 32b attached respectively to wings 25a and 25b and to central panel 26, and to engine 22 by connections 30, two concentric circular skins 33a and 33b joining the preceding ones, and an internal stiffening skin 34, which extends between circular skins 33a and 33b halfway between flat skins 32a and 32b. A perhaps more remarkable element of this embodiment is a stiffening hoop 35 which connects the ends of attaching flange 31, where it is connected to one of them and secures the other by passing under engine 22; its role is not to support engine 22 but to improve the cohesion of the connecting portion (24b in this embodiment); it is recommended that attaching flange 31 then extends over slightly more than a half-circle, and hoop 35 over slightly less. A disadvantage common to both these embodiments nonetheless appears when main portion 23 of structure must be at some distance from the region of attachment to engine 22 in the axial direction, for example to position it at some distance from propellers 36, which then means that connecting portion 24a or 24b must be lengthened, and a substantial overhang must be left between main portion 23 of structure 20 and connections 30 to engine 22. The forces due to these overhangs can be partly absorbed by stay beams 37 (represented in FIG. 5) connecting attaching flange 29 to main portion 23 or, in an equivalent manner, full ribs 38 extending at the same locations. A more radical design to reduce the overhang effects, by eliminating this overhang from connecting portion 24a or 24b, will be described by means of other embodiments of the mounting structure, described in detail below.

Figure 10:
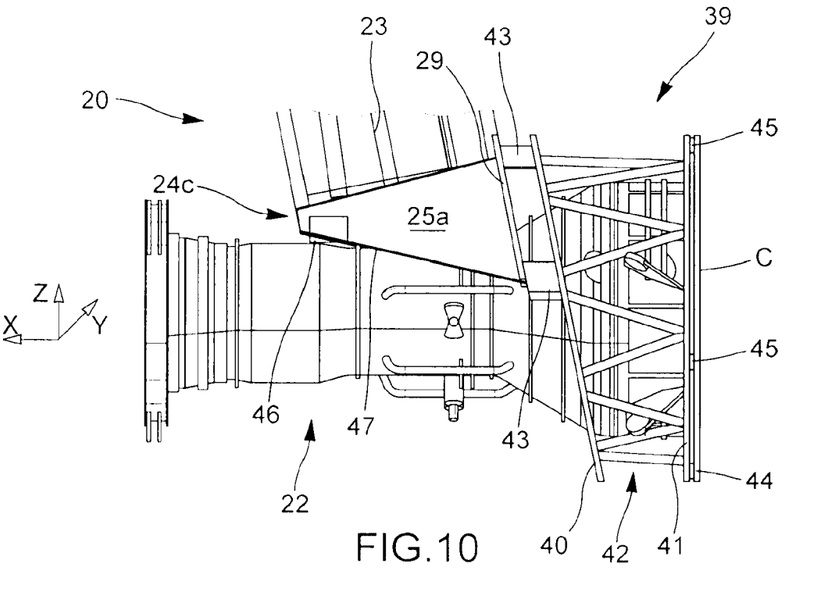
FIGS. 10 and 11 represent a first possible embodiment of the invention.
Figure 11:
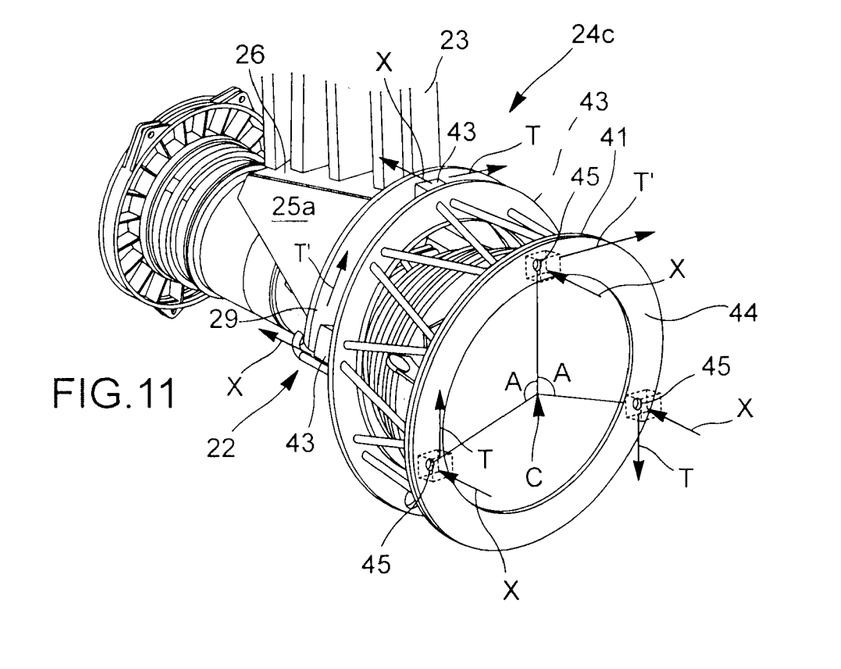

Reference will be made to FIGS. 10 and 11. Connecting portion 24c includes as above wings 25a, 25b and central panel 26, but in this case they are less wide, i.e. they do not extend beyond main portion in axial direction X of the aircraft. Attaching flange 29 in this case is not attached directly to engine 22, but to a mounting element 39 consisting of a first flange 40, a second flange 41 and a rigid structure 42 which is intermediate to flanges 40 and 41. First flange 40 is connected to attaching flange 29 by bolts or by rigid or flexible separate connections (43); and second flange 41 is connected to a flange 44 of engine 22, by bolts or rigid or flexible separate connections (45). Second flange 41 and connections 45 surround a region of the centre of gravity C of engine (represented in truncated fashion in these figures). Rigid structure 42 can consist of panels or, perhaps more advantageously, discontinuous elements over the circumference, such as frames, beams or tubes, which have been represented. It should be noted that flanges 40 and 41 have no required alignments and are not necessarily parallel with one another: it is plausible for second flange 41 supporting connections 45 to engine 22 to be in a plane which intersects at right angles the axis of engine 22, and for first flange 40 to be oblique, parallel to attaching flange 29 extending the rear face of main portion 23 of structure 20, where this main portion 23 can be inclined; but this is not essential.

Mounting element 39 intermediate to connecting portion 24c and to engine 22 has greater resistance than this portion, and therefore resists the forces produced by the overhang better than it. Another advantage is that it forms a circular structure which completely encloses engine 22 and therefore resists what are called disc ruptures, i.e. damage to the rotor of engine 22 in which a portion extending over an angular sector is detached and is projected under the action of centrifugal forces outside the engine, puncturing its case and destroying the surrounding structures. These disc ruptures, which can occur in a variety of locations, can damage or even rupture the structure; but this eventuality should be ruled out in this case, since mounting element 39 extends over a complete circumference of engine 22, and should therefore remain largely intact, even if the rupture projectile passes through it; and, in addition, structure 20 and attaching flange 29 have sufficient extensions in the direction of the engine's axis, and in an angular direction for them not to be cut completely by a disc rupture in their direction.

Judiciously chosen connections allow isostatic assemblies, which enable the distribution of the stresses to be controlled, and by this means the most favourable stresses to be prevented in the elements which they connect, namely the bending stresses in connecting portion 24 and also in engine 22, since the deflections lead to irregularities of play between the rotor and the stator, to reductions of performance, and possibly to premature wear and tear.

An assembly of interest includes three connections 45 between second flange 41 and flange 44 of the engine, regularly distributed over the circumference, with one positioned in the upper cone distance, and where each is designed to be able to transmit a force in axial direction X and another force in tangential direction T of the engine. The distribution can be absolutely regular, with connections 45 at angles of 120°, or less regular, where lateral connections 45 form angles A of 90° to 120° with upper connection 45. In addition, connections 43 between first flange 40 of mounting element 39 and attaching flange 29 are designed to transmit forces in direction X and in direction T', which is roughly tangential to the flanges, and directed precisely in the main direction of wing 25a or 25b or of central panel 26, in front of which connections 43 extend respectively. A final flexible connection 46 will be noted, directly connecting the lower face of central panel 26 and engine 22, forward of structure 20, i.e. the other side of attaching flange 29 from other flexible connections 43 and 45.

In a particular embodiment connections 43 and more specifically 45 can be flexible. This embodiment enables the engine's vibrations to be filtered out from the remainder of the aircraft.

The effects of this design can be explained as follows. If engine 22 is attached in a plane passing through the centre of gravity it is then possible to uncouple the eigenmodes of vibration which are transmitted to the remainder of the aircraft, and easier to act on them to reduce them, using known measures, and notably by judiciously choosing flexible connections 45 and their positions. Uncoupling, resulting from the isostatic assembly, and the flexibility of the flexible connections, therefore enable the vibrations to be filtered, and the choice of connections transmitting only axial forces X and tangential forces T prevents bending stresses from being transmitted in mounting element 39. Flexible connections 43 adjacent to attaching flange 39 have comparable properties and effects of preventing bending wings 25a, 25b and central panel 26, and of enabling the vibrations to be filtered. Transmission of the forces of engine 22 to structure 20 is gradual, without excessive irregularity of the stresses in connecting portion 24c and mounting element 39, if connections 43 and 45 are quite well aligned in pairs in direction X, i.e. if there are equal numbers of connections 43 and 45, with close angular spaces. The forces resulting from the overhang are sustained principally by mounting element 39, which is very rigid, then by wings 25a and 25b which, whilst being less rigid, also resist them satisfactorily due to their flatness, to the absence of forces perpendicular to their plane and to their support by main portion 23 over their entire width (in axial direction X). Additional flexible connection 46 enables a proportion of forces Y and Z due to the overhang to be transmitted. It can also be used to filter out certain modes of vibration, without introducing a deflection harmful to engine 22.

Despite all the advantages of the separate connections these can be eliminated, and flanges 39, 40, 41 and 44 can be fishplated using bolts, which may imply that the assembly is lighter.

Another advantage of wings 25a and 25b is that they can easily be fitted with an oblique edge 47, such that they become shorter towards the front, i.e. that they cover engine 22 less, and therefore allow easier access than the habitual quarter-circle structures, which it would be more difficult to manufacture with such an edge.

Figure 12:
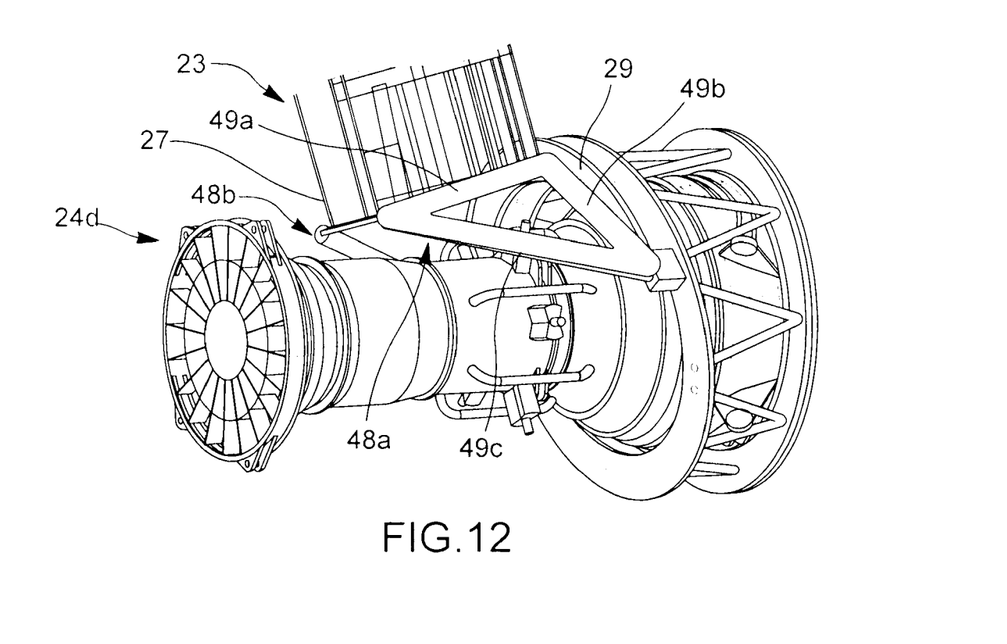
FIG. 12 represents a second possible embodiment of the invention.

FIG. 12 is now considered for another embodiment of a connecting portion 24d. Wings 25a, 25b are replaced by wings 48*a* and 48*b*, which are also flat, and which have approximately the same extension, but which do not consist in this case of panels or plates, but of sets of three connecting rods connected to one another in a triangle, where a first of connecting rods 49*a* extends along the end face of main portion 23, where a second, 49*b*, along the length of attaching flange 29, and the third, 49*c*, between the previous ones, in the position of oblique edge 47 of the other embodiment. It is possible for central panel 26 to be absent. The invention is applicable to different types of engine, notably propfans and turbofans. The structure can be mounted on the fuselage or on a wing surface of aircraft 21.

The invention claimed is:

1. An aircraft assembly comprising:
a mounting structure;
an engine; and
a mounting element extending between the mounting structure and the engine;
wherein the mounting element includes a first flange attached to the structure, a second flange attached to the engine, the flanges being circular, and a rigid structure to connect the flanges, and the flanges and the rigid structure surround and completely enclose the engine,
wherein the second flange extends around a center of a gravity region of the engine, and the engine is assembled on the structure with an overhang, the overhang entirely belonging to the mounting element.

2. An aircraft assembly according to claim 1, wherein the rigid structure includes separate elements, and is discontinuous over the circumference of the flanges.

3. An aircraft assembly according to claim 1, wherein the second flange or the first flange is attached to the engine or to the mounting structure by separate connections defining an isostatic assembly between the first flange or the second flange and the mounting structure or the engine.

4. An aircraft assembly according to claim 3, wherein there are three connections, distributed around the first or second flange and shaped to transmit forces in two directions each, wherein the two directions are an axial direction of the aircraft and an essentially tangential direction of the first flange or of the second flange for each of the connections.

5. An aircraft assembly according to claim 3, wherein each of the flanges has one of the connections to an upper cone distance and the connections are distributed around the second flange forming angles of 90° to 120° between them, but are distributed around the first flange forming angles of at most 90°.

6. An aircraft assembly according to claim 1, further comprising a flexible connection between the engine and the structure, wherein the additional flexible connection and the mounting element are located on either side of the mounting structure in an axial direction of the aircraft.

7. An aircraft assembly according to claim 3, wherein at least some of the connections are flexible.

8. An aircraft assembly according to claim 1, wherein the mounting structure includes a linear main portion and a connecting portion joining the main portion to the mounting element, the connecting portion includes two flat wings extending laterally to the main portion forming an angle between them, and an attaching flange extending over at least a sector of a circle, attached to the wings by a flat face and attached to the first flange of the engine's mounting element by an opposite face.

9. An aircraft, fitted with an aircraft assembly according to claim 1.

* * * * *